US011530568B2

(12) United States Patent
Battlogg

(10) Patent No.: US 11,530,568 B2
(45) Date of Patent: Dec. 20, 2022

(54) METHOD FOR CONTROLLING DOOR MOVEMENTS OF THE DOOR OF A MOTOR VEHICLE, AND MOTOR VEHICLE COMPONENT

(71) Applicant: INVENTUS ENGINEERING GMBH, St. Anton I.M. (AT)

(72) Inventor: Stefan Battlogg, St. Anton I.M. (AT)

(73) Assignee: INVENTUS Engineering GmbH, St. Anton im Montafon (AT)

( * ) Notice: Subject to any disclaimer, the term of this patent is extended or adjusted under 35 U.S.C. 154(b) by 247 days.

(21) Appl. No.: 16/892,895

(22) Filed: Jun. 4, 2020

(65) Prior Publication Data
US 2020/0386033 A1  Dec. 10, 2020

(30) Foreign Application Priority Data

Jun. 4, 2019 (DE) .............................. 102019115073
Aug. 12, 2019 (DE) ............................. 102019121642

(51) Int. Cl.
*G08B 21/00* (2006.01)
*E05F 15/73* (2015.01)
(Continued)

(52) U.S. Cl.
CPC .............. *E05F 15/73* (2015.01); *B60N 2/002* (2013.01); *B60Q 9/00* (2013.01); *B60Q 9/008* (2013.01);
(Continued)

(58) Field of Classification Search
CPC . E05F 15/73; E05F 15/40; E05F 15/41; E05F 15/611; E05F 15/76; E05F 15/79; E05F 15/622; E05F 2015/763; E05F 2015/765; E05F 2015/767; E05F 15/44; B60N 2/002; B60Q 9/00; B60Q 9/008; B60R 21/013; B60R 21/0134; E05C 17/006; E05Y 2400/322; E05Y 2400/56; E05Y 2900/531
(Continued)

(56) References Cited

U.S. PATENT DOCUMENTS 10,173,585 B1 *  1/2019  Rrumbullaku ........ G01S 13/931
10,635,174 B2    4/2020  Battlogg
(Continued)

FOREIGN PATENT DOCUMENTS

DE    102015214793 A1   2/2017
DE    102017200257 A1   7/2017
(Continued)

*Primary Examiner* — Mark S Rushing
(74) *Attorney, Agent, or Firm* — Laurence A. Greenberg; Werner H. Stemer; Ralph E. Locher

(57) ABSTRACT

A method for controlling door movements of a controllable door of a motor vehicle, and a motor vehicle component. A control device and a sensor arrangement are attributed to the door. The door has a controllable motion influencing device, wherein a motion of a door wing of the door can be controlled and influenced by way of the motion influencing device to alternate between a closed position and an open position. The control device obtains position data which are representative of the geographic position of the motor vehicle and the control device controls movements of the door wing in dependence on the position data.

14 Claims, 6 Drawing Sheets

(51) Int. Cl.
*B60N 2/00* (2006.01)
*E05F 15/79* (2015.01)
*B60Q 9/00* (2006.01)
*E05F 15/611* (2015.01)
*B60R 21/013* (2006.01)
*E05F 15/40* (2015.01)
*E05F 15/41* (2015.01)
*E05F 15/76* (2015.01)
*E05F 15/622* (2015.01)
*E05C 17/00* (2006.01)

(52) U.S. Cl.
CPC ............ *B60R 21/013* (2013.01); *E05F 15/40* (2015.01); *E05F 15/41* (2015.01); *E05F 15/611* (2015.01); *E05F 15/76* (2015.01); *E05F 15/79* (2015.01); *E05C 17/006* (2013.01); *E05F 15/622* (2015.01); *E05F 2015/763* (2015.01); *E05F 2015/765* (2015.01); *E05F 2015/767* (2015.01); *E05Y 2400/322* (2013.01); *E05Y 2400/56* (2013.01); *E05Y 2900/531* (2013.01)

(58) Field of Classification Search
USPC .............................................. 340/436; 701/49
See application file for complete search history.

(56) References Cited

U.S. PATENT DOCUMENTS

| 10,697,226 | B2 | 6/2020 | Gussen et al. |
| 2017/0218678 | A1* | 8/2017 | Kothari ................... E05F 15/73 |
| 2017/0247933 | A1* | 8/2017 | Elie ......................... E05F 15/40 |
| 2019/0284851 | A1* | 9/2019 | Miyashiro ............. E05C 17/006 |

FOREIGN PATENT DOCUMENTS

| DE | 102016220171 A1 | 4/2018 |
| DE | 102018220051 A1 | 5/2020 |
| WO | 2017001696 A1 | 1/2017 |

* cited by examiner

METHOD FOR CONTROLLING DOOR MOVEMENTS OF THE DOOR OF A MOTOR VEHICLE, AND MOTOR VEHICLE COMPONENT

CROSS-REFERENCE TO RELATED APPLICATION

This application claims the priority, under 35 U.S.C. § 119, of German patent applications DE 10 2019 115 073, filed Jun. 4, 2019 and DE 10 2019 121 642, filed Aug. 12, 2019; the prior applications are herewith incorporated by reference in their entirety.

BACKGROUND OF THE INVENTION

Field of the Invention

The present invention relates to a method for controlling the door movements, or motions, of at least one controllable door of a motor vehicle, and a motor vehicle component, wherein at least one control device and at least one sensor arrangement is associated with the door. The door comprises a controllable motion influencing device. The motion of at least one door wing of the door can be at least partially controlled and influenced to alternate between a closed position and an open position.

The prior art has disclosed controllable motor vehicle doors equipped for example with an electric motor for automatically opening and/or closing the door. Also, motor vehicles have been disclosed provided with doors which can be locked in a suitable position to allow the user ease of entering and exiting. These motor vehicles having this kind of doors provide users with increased comfort and satisfactory use. However, further improvements are conceivable. Sensors may serve for recognition of fixed or moving obstacles in the motion range of a door. For example a vehicle in an adjacent parking space. However, even using a plurality of sensors does not readily or always allow to reliably identify any and all kinds of items, obstacles, interfering bodies and objects within the motion range of a door. Moreover, the cost-benefit ratio cannot be neglected, the system must be affordable for the customer.

BRIEF SUMMARY OF THE INVENTION

It is accordingly an object of the invention to provide a system, which overcomes the above-mentioned and other disadvantages of the heretofore-known devices and methods of this general type and which provides for an improved method for controlling the door motions of at least one controllable door of a motor vehicle, and a suitable motor vehicle, by means of which to better avoid damage from objects within the motion range of a door while opening the door.

With the above and other objects in view there is provided, in accordance with the invention, a method of controlling a door movement of at least one controllable door of a motor vehicle, the method comprising:

providing at least one control device and at least one sensor arrangement associated with the door and providing the door with a controllable motion influencing device;

selectively influencing a movement of a door wing of the door under control of the motion influencing device in alternation between a closed position and an open position; and acquiring position data with the control device that are representative of a geographic position of the motor vehicle, and controlling the movement of the door wing with the control device in dependence on the position data.

In other words, the method according to the invention serves for controlling the door motions of at least one controllable door of a motor vehicle, wherein at least one control device and at least one sensor arrangement is attributed to the door. The door comprises a controllable motion influencing device. The motion of a door wing of the door can be at least partially controlled and influenced by the motion influencing device to alternate between a closed position and an open position, respectively between an open position and a closed position.

The control device serves among other things to obtain position data, which are representative of the geographic position of the motor vehicle, and the control device controls motions of the door wing in dependence on the position data.

The method according to the invention has many advantages. A considerable advantage of the method according to the invention is the fact that data is taken into account in relation to the situation in which the motor vehicle and the user can be found. Taking into account the position of the motor vehicle allows improved functionality, since controlling the opening and closing motions of a door may differ in front of a kindergarten from parking the motor vehicle on an isolated beach. Likewise, the user's driveway typically shows conditions different from the car park of a supermarket. The method according to the invention takes into account these significant differences better than does the prior art. The motions of a door wing are controlled so as to take into account the currently prevailing situation.

Correspondingly, when controlling door motions, the geographic position and position data of the motor vehicle are included. The geographic position and the position data allow an initial assessment of the situation. It can be detected whether the motor vehicle is standing on the beach or in a car park, and controlling can be performed accordingly.

The motion influencing device comprises in particular a driving device and/or a braking device. The motion influencing device allows for example to actively open a door. Preferably the door may also be actively braked.

Position data on the current position of a motor vehicle may in particular be detected by a position sensor. In particular can a satellite-based system be employed which captures position data via GPS or Glonass or Galileo or Beidou etc. It is also possible to use a combination of various satellite-based systems. One can use and include e.g. smartphone data and/or smart device data.

Alternately, position data can be obtained on the geographic position of the motor vehicle, for example in particular via a wireless data interface, for example from the internet. A wireless data interface for example allows to obtain data from the radio cell or multiple radio cells (including from different mobile radio providers). Moreover any available WLAN network may be used for position determination. Access to the pertaining WLAN network is not required. It is basically sufficient for the WLAN network e.g. of a café, hotel, or restaurant to be within operating range. Access to a network is not required. A number of internet companies allow position determination via accessible WLAN networks.

When a café is located on one side of a street, and a restaurant on the other side, and both WLAN networks can be received, it is highly probable that one's own location is (about) in the center between the two places. A suitable number of further WLAN networks (or mobile radio networks) allow a very accurate, or more accurate, position determination. One can also use Bluetooth transmitters and receivers, other than WLAN networks. One can also use other radio networks to obtain suitable accuracy.

Preferably the sensor arrangement comprises different sensors, at least one of which is employed. Thus, the sensor arrangement may comprise ultrasound sensors, radar sensors, Lidar sensors, image sensors and/or acceleration sensors, and other sensor types. These sensors allow to detect, and determine the distance from, interfering objects.

The sensors allow to identify a situation and to control the door motions in relation to the situation. One of the situation parameters is the position. Other parameters may be added.

Inside space sensors are preferably provided and employed. An image sensor can for example monitor the motor vehicle's interior. Seatbelt sensors and seat sensors supply information whether a person is sitting on a specific seat and what their behavior is. It is also conceivable to count the entering and exiting persons. The positions and each of the sensors also allow conclusions on a location. Conclusions are thus possible on a gradient or a slope, and on the terrain.

Weather data is preferably also used to enable situation-based responses. On a windy day the braking device is activated to prevent unintended opening of a door. Given water freezing point temperatures or in the presence of snow or slippery ice it is also advantageous to activate the braking device when a person exits so that the user can better hold onto the door. Preferably, data on the time of day, date, day of the week, outside air temperature, and annual season, and air humidity are also used. All this data constitutes parameters, such as the time of day, day of the week, annual season, outside air temperature, the direction and force of the wind, or the question whether it is raining.

In all the configurations it is preferred to store the data. Preferably the control device or an evaluation unit serve to check the stored data for repeat events. Situation recognition can thus be performed. Significant data of a recognized situation is preferably stored. For example the ambience conditions in the workplace or near the home or house of the user at various different times are relatively comparable. Fixed objects, fences, plants and flowerpots etc., which may collide with a door, are thus reliably detected in the course of time, and proper and reproducible responses to the location concerned are made. The annual season may be considered for plants (bushes . . . ). Bushes look different in winter and in summer (foliage . . . ). Particularly bushes are obstacles difficult to identify and classify. Recognition can thus be much improved. The control device may virtually "learn continuously", since recognition of an obstacle is stored. Its position may be directly retrieved next time. An obstacle once recognized will not simply be "overlooked". If it should be absent once and later present again, it will then be more readily detected because the control program of the control device is "sensitized".

For example if a user takes his children to the kindergarten in the morning, always at a set time, then the control device registers this repeat event, and it may actively for example activate a time-delayed or situation-based different opening mode for the rear doors (e.g. the door can only be opened slowly and/or only up to a restricted angle), so that the driver can exit first. In this way, children are prevented from getting into danger unattended.

Situation recognition may be provided using stored position data, pertaining times, and also data from at least one inside space sensor. Inside space recognition allows conclusions on the number and type of the occupants. Children behave differently from adults.

As a known situation is detected, pertaining preset parameters and settings for the door wing motion are preferably loaded. Thus, a suitably adapted opening and/or closing speed may be varied. The maximum opening angle may also be preset accordingly. One can also set whether automatic opening is desired or not, and/or whether the door wing is to be fixed when open, to provide an exiting aid.

It is particularly preferred to provide manual selection of stored situations. For example one of the stored situations may be retrieved and selected. This may happen e.g. if the driver drives to the children's school at a time different from otherwise or at an unusual time, e.g. in the case of driving to, and pickup from, a special event. The control device detects by way of the position that the school or the kindergarten is in the vicinity, autonomously suggesting the situation "take children to school", when the seat detector detects the children on the rear seats.

Situations can also be stored upon the user's request for later retrieval.

Preferably the control device suggests possibly applicable stored situations, which can then be selected.

Operation by voice command is also possible. The control device may identify, responding only to, the driver's voice or specified voices. For speech recognition, the microphone of a hands-free set available in the motor vehicle or a microphone for controlling the navigation system or the like may be used.

A motor vehicle component serves in particular to perform a method described above, comprising at least one controllable door, at least one control device, and at least one sensor arrangement. The door comprises a controllable motion influencing device, wherein a motion of a door wing of the door can be at least partially controlled and influenced by means of the motion influencing device, to alternate between a closed position and an open position. The control device is configured and set up to obtain position data which are representative of the geographic position of the motor vehicle. The control device is configured and set up to control motions of the door wing in dependence on the position data.

Other features which are considered as characteristic for the invention are set forth in the appended claims.

Although the invention is illustrated and described herein as embodied in a method for controlling door motions of the door of a motor vehicle, and motor vehicle component, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1A:
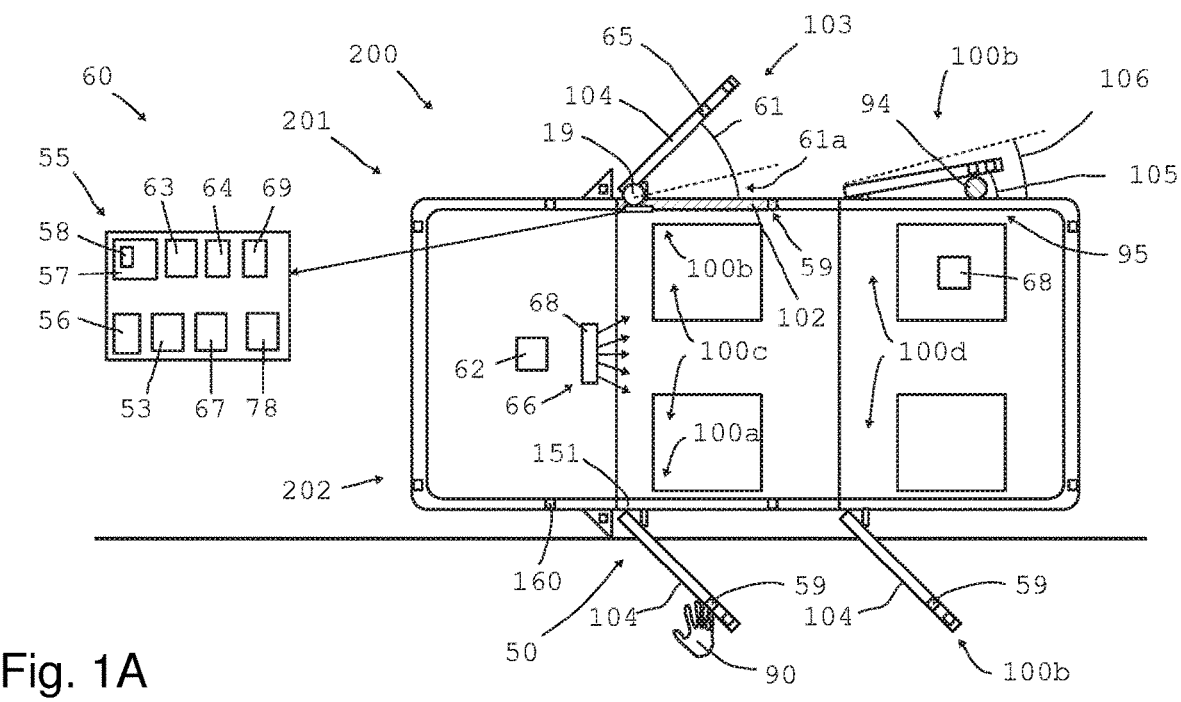
FIG. 1A a simplistic plan view of a motor vehicle in a first position.
Figure 1B:
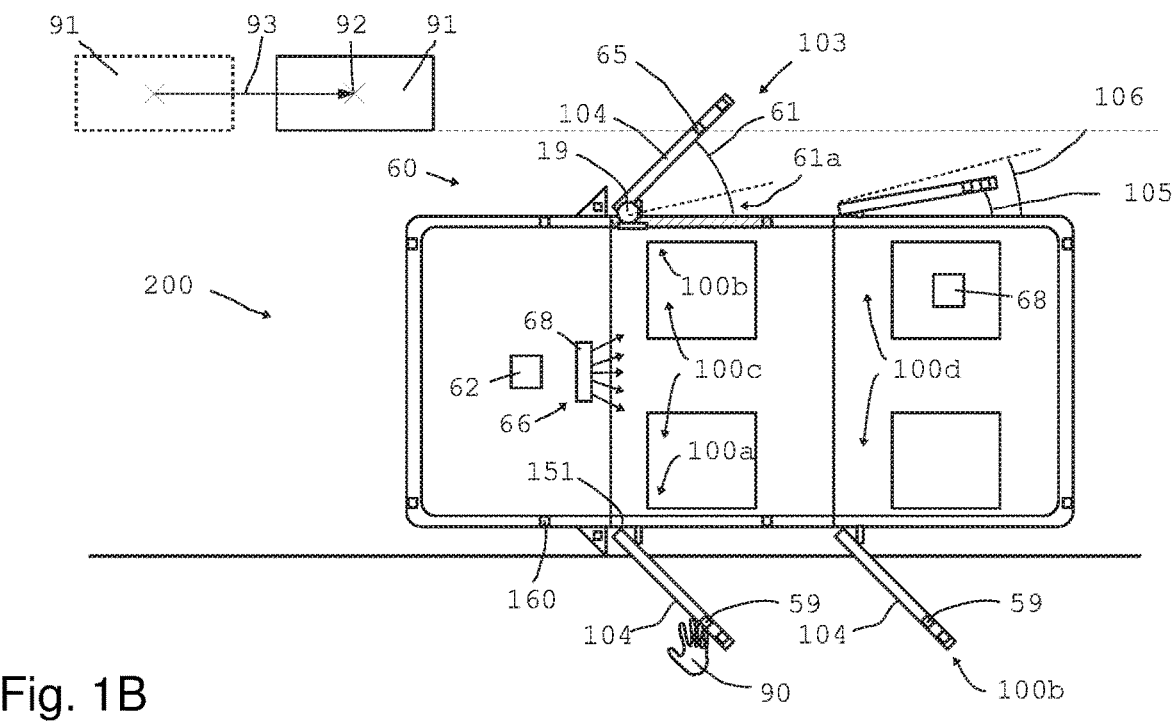
FIG. 1B a simplistic plan view of a motor vehicle in another position.

Referring now to the figures of the drawing in detail and first, particularly, to FIGS. 1A and 1B thereof, there are shown two different positions of a motor vehicle 200, which is a passenger car here. The motor vehicle 200 is shown in a schematic plan view from above. The motor vehicle 200 has four doors, namely two front doors 100c and two rear doors 100d. The driver door in motor vehicles travelling on the right-hand side of roads and streets is on the left, so that the main door 100a is on the front left, while the other doors are configured as secondary doors 100b. In principle (at least) one, or any, desired door may be defined as the main door.

In FIG. 1A all the doors are shown in differently wide open positions. The two front doors 100c are each in its maximum open position 103 which shows an angle 61, so that a pertaining maximum angular range 61 ensues.

On the whole at least one sensor arrangement 60 is provided which may comprise multiple, different sensors, which may be disposed distributed over the motor vehicle 200. It is thus possible to use for example the same location sensor 62 for different doors 100. The motor vehicle 200 is provided with angle sensors 19 in the doors 100, a position sensor 63, an inclination sensor 64, which may for example be configured as an acceleration sensor, surround sensors 65 in particular configured as distance sensors, at least one image sensor 66, radar sensors 67, in particular one or more inside space sensors 68, and at least one current sensor 69 for capturing the power demand of the drive motor 75 of the driving device 70. Sensors 160 serving e.g. as parking sensors for distance measurement may be provided on the rear and the front and optionally on the sides. The motor vehicle 200 with the motor vehicle component 201 is in the position 202 in FIG. 1A.

The inside space sensors 68 may for example also include an image sensor 66 for detecting the number and kind and/or size of the occupants. Personal identification of certain persons is in particular possible (family, circle of friends or colleagues, etc.).

The control device 55 is provided with a comparator 56, a memory device 57, in which tables and charts 58 can be stored. The memory device 57 may store data from previous situations. The data may be retrieved. This data may include location information (position 202 etc.) including data on the type of location (shopping center, workplace, beach, meadow etc.), time data (time of day, day of the week, annual season), weather data (temperature, humidity, wind speed and wind direction) and parameters for the motion influencing device 50 (see FIG. 2) and further parameters and data.

For example when the front passenger door 100b on the right is closed, the door wing 104 first moves at a high pivoting speed. As a smaller angular range 61a is reached, the speed is reduced. In case that an arm or hand or leg of a person is caught or a collision with some object is detected, the lower speed allows very fast response so that any effects remain relatively small.

Such a situation is shown for the rear door on the right, exemplarily indicating an item 94 preventing the door wing 104 from closing further. If such a situation is detected, in which the door wing hits against an item 94 or in which an object is pinched, then the drive motor 75 stops and immediately reverses its rotational direction. Thus the angle is enlarged from the narrower angle 105 to the somewhat larger angle 106 so that the item 94 may be removed.

A weight sensor 68 in each of the seats in the interior can inform the control device 55 about which of the seats are occupied and about the weight of each occupant. Thus, the control device 55 may "memorize" which person prefers which seat. Thus, young and therefore lightweight children tend to sit on the rear seats. The weight data allows to individually associate a person with a seat. This allows individual control of the pertaining door 100 for each person.

The driver door exemplarily shows a hand 90 of a user touching the main door 100a. A pertaining hand sensor 59 may inform the controls that a user for example holds onto the door 100 when exiting, and may correspondingly actuate the braking device 1. The seat detector senses via a weight sensor 68 that the driver has already exited. After exiting, and when the hand 90 has detached, the control device 55 may automatically release the braking device 1 and for example automatically close the door wing 104.

FIG. 1B shows a slightly different position of the motor vehicle 200 in a simplistic plan view from above. Therein an object 91 moves in the direction of the arrow 93, the arrow 93 indicating the direction and its length, the speed of movement of the object 91, which is e.g. relatively slow. The object 91, such as a shopping cart, is moving straight toward the righthand passenger door 100b. The variant in broken lines exemplarily shows the object at an earlier time, and the solid variant, the object 91 at the present time. This allows to determine the movement direction and movement speed.

The door 100b is wide open for example after the user has stepped out, leaving the door wide open. If the movement of the object 91 does not change, it would hit against the door wing 104, which may result in damage to the surface paint or the metal door sheet.

Via the sensor data of the sensor arrangement 60, the control device 55 detects that the object 91 is on a collision course and, for example by way of the surround sensor or distance sensor 65, captures the current distance from the object 91. Then the control device 55 activates the drive motor 75 of the righthand passenger door 100b, automatically closing the door wing far enough for the object 91 to safely pass the motor vehicle 200 without colliding with the door 100.

It is possible for the door 100 to move so as to always maintain at least a minimum distance from the object 91. It is also possible to shift the door to the closed position 102 or to assume an open position in a very narrow opening angle 105.

For example if the door has originally been in the opening angle 105 and captured the object 91 via the distance sensor 65 attached to, or integrated in, the door, then the door can be actively pivoted about a comparatively narrow angular range to thus capture distance data of the moving (or stationary) object 91 from various angular positions. The door wing 104 may for example be pivoted up to the slightly wider angle 106.

The measurement data from the various angles allow to triangulate the object 91 by means of one single sensor 65. By employing a suitable measuring frequency and considering the known movement speed of the door wing 104, a reliable determination of the position 92 of the object 91 and its movement direction and movement speed is possible while using just one single distance sensor 65.

Sensor data of further sensors of the sensor arrangement 60 may be referred to for example to better determine the dimensions of the object 91.

In the example shown in FIG. 1B, the door wing 104 e.g. of the rear door on the right may remain open unchanged since no direct collision is imminent. However, it is also possible to close the rear door 100d on the right further to avoid collision.

Figure 2:
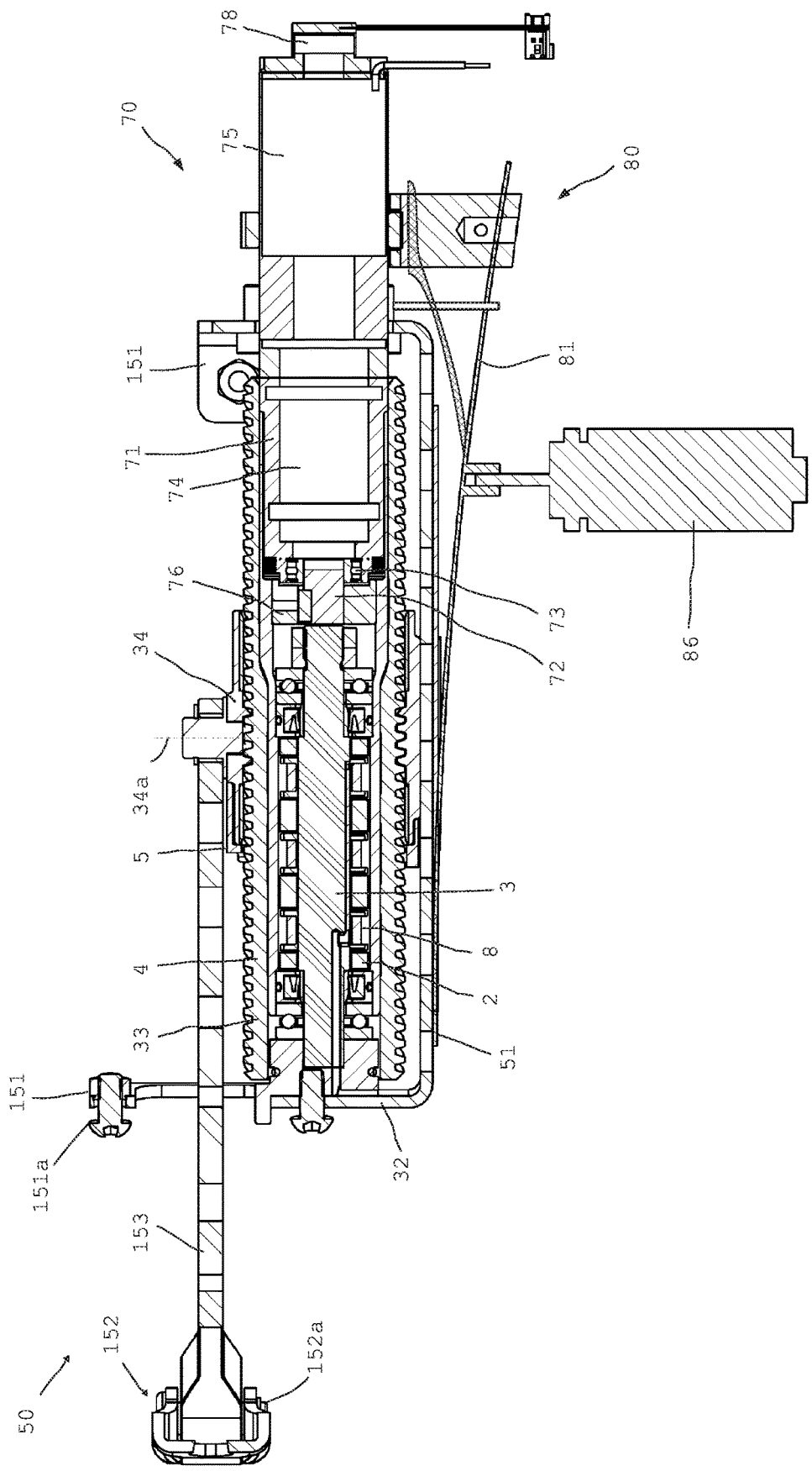
FIG. 2 a schematic section of a motion influencing device with a driving device and a braking device.

FIG. 2 shows an exemplary embodiment in section, wherein a motion influencing device 50 for a door or door component 100 is provided. The door component 100 respectively the motion influencing device 50 comprises connecting units 151 and 152 for mounting to the motor vehicle 200. The first component 32 is for example fixedly connected with the door. The first component 32 is provided with a rotary takeup 3, presently configured as a coupling rod 3. The second component 33 is rotatably supported on the rotary takeup 3, wherein the second component 33 comprises a threaded spindle 4 on its outside, so that it is designed as a spindle unit 4.

A third component 34 configured as a spindle unit 5 is provided. The third component 34 is coupled with the second component 33. The spindle unit 5 comprises an internally threaded spindle nut 5 meshing with the external thread of the spindle unit 4 of the second component 33. The intermeshing spindle units 4 and 5 convert axial movement of the two connecting units 151 and 152 relative to one another to rotational motion.

A controllable braking device 1 is configured in the interior of the second component 33 for decelerating the rotational motion. The braking device 1 is configured as a controllable rotary brake for at least partial, controlled damping of motion of a door wing 104 between a closed position 102 and an open position 103. The driving device 70 with the drive motor 75 serves for controlled motion.

The third component 34 accommodates the coupling profile 153 for pivoting around the pivot axle 34a. The pivot axle 34a may e.g. be designed as a bolt or axle stub on the third component 34 to pivotally accommodate a boss of the coupling profile 153. The pivot axle 34a is transverse, presently perpendicular, to the rotation axis 33a of the second component 33. The in particular rod-shaped coupling profile 153 is connected with the second connecting unit 152 by its second end for pivoting around the pivot axle 152a. The pivot axle 152a may alternately be configured as a bolt or axle stub on the second connecting unit 152, pivotally accommodating a boss of the coupling profile 153. The coupling profile 153 is pivotally connected with the third component 34 at a first end, and pivotally with the second connecting unit 152, at its second end. The second connecting unit 152 may e.g. be attached to, or configured on, the A-pillar or B-pillar of the motor vehicle.

The driving device 70 is accommodated in the second component 33 to actively control respectively actively guide the door. The drive housing 71 is rotatably supported in a drive accommodation 73. A normally non-rotatable connection between the drive housing 71 of the drive motor 75 and the first component 32 may be disconnected by the actuator 80, which here comprises a drive 86. The drive 86 may be displaced in the vertical direction, thus disconnecting and re-establishing a non-rotatable connection of the drive housing with the first component 32. The actuator 80 is provided optionally only and, if it is installed, allows undisturbed, simple pivoting of the motor vehicle door in a "manual mode" without motor support. In many configurations the actuator 80 is not comprised, and the drive motor 75 is in a continuously engaged state. Thus, in the configurations shown in the FIGS. 4 to 6.

The second component 33 is provided with the first spindle unit 4. Furthermore, the second spindle unit 5 is configured on a third component 34. The internal toothing of the spindle unit 5, configured as a spindle nut, engages the external toothing of the spindle unit 4, configured as a threaded spindle, so that in the case of a relative rotational motion of the second component relative to the third component, the connecting units 151 and 152 are axially displaced to one another.

Actuating the drive motor 75 then causes direct rotation of the two components 32 and 33 relative to one another. Since the second component 33 is configured with a threaded spindle 4, which is engaged in the threaded nut 5 of the third component 34, the motor thus causes axial displacement of the connecting units 151 and 152 relative to one another.

In the decoupled position, when the actuator 80 is not fixedly coupled with the drive housing 71, the angular positions of the components 33 and 32 relative to one another can be readily and solely manually be displaced.

The drive unit is not mandatorily required to be disposed coaxially to the braking device 1. It may be disposed parallel or at an offset. The torque may be transmitted for example via V-belt, toothed belt, gear wheels, bevel gear wheels, chain drive, friction wheels or the like. The shaft 72 may e.g. be provided with a toothed belt gear. The component 33 may show at its extreme end a toothed belt profile which is then operatively coupled by means of a toothed belt, with the toothed belt gear of the motion influencing device 50 respectively the drive unit 70.

Figure 3:
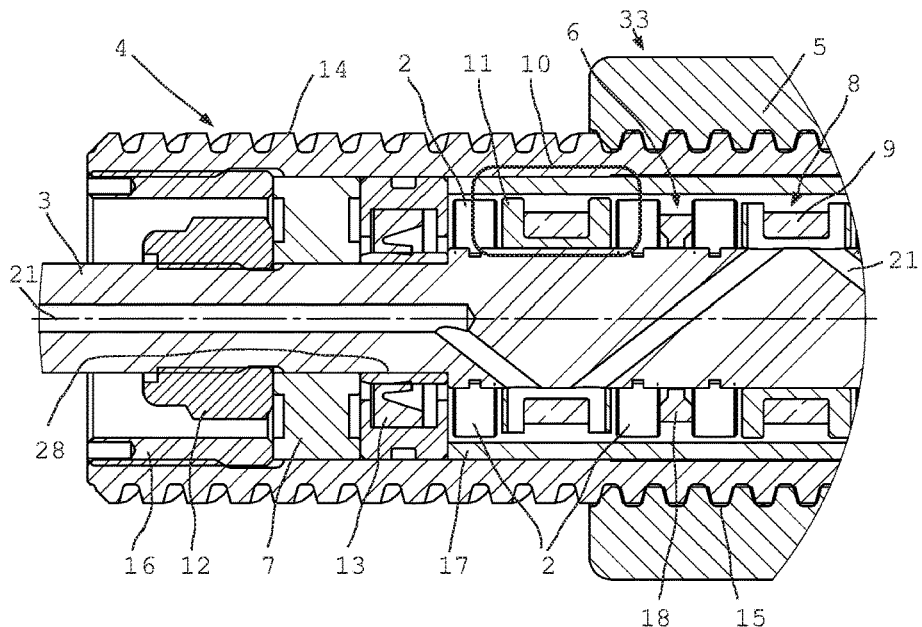
FIG. 3 an enlarged schematic detail according to FIG. 2.

FIG. 3 shows an enlarged detail of the motion influencing device 50 with the driving device 70 and the braking device 1. Of the three components 32, 33 and 34, the first component 32 is connected with the body of the motor vehicle 200, and the second component 33 is connected or coupled with the door wing 104. The second component 33 is rotatably supported on the rotary takeup 3, which is configured as an axle unit. Bearings 7 are disposed between the axle unit 3, which may also be referred to as coupling rod, and the second component 33. Between the bearings 7, electric coils 9 are disposed against which a rotary body 2 each abuts in the axial direction. The electric coils 9 provide a magnetic field source 8. When the electric coils 9 generate a magnetic field, this results in a braking momentum between the two components 32 and 33. The braking device 1 allows to apply a strong braking momentum in any desired angular position, so as to prevent inadvertent changes to the opening angle of the door wing 104.

FIG. 3 also shows exemplarily the curve of the magnetic field 10 respectively field lines of a magnetic circuit.

The magnetic field generated by the electric coil 9, which is a magnetic field source 8, runs through a section of the magnetically conducive sleeve 17, passing through a rotary body 2 disposed adjacent to the electric coil, and enters into the coupling rod respectively rotary takeup 3 likewise consisting of a ferromagnetic material, and returns axially as far as the next rotary body 2, where the magnetic field lines re-enter radially passing through a rotary body 2 and into the sleeve 17, where they close. Preferably two separate rotary bodies 2 each are provided between pairs of axially adjacent coils. Multiple magnetic circuits may be provided which are axially spaced apart from one another. Each magnetic circuit may for example comprise two rows of rotary bodies 2, which are disposed to the right and left of an electric coil 9, distributed over the circumference. The larger the number of magnetic circuits/rotary body units performed, the higher is the maximum braking momentum.

It is also possible to provide rotary bodies elongated in the axial direction, so that the magnetic field of the electric coil 9 adjacent on one axial side, flows through one end of an elongated, cylindrical rotary body, while the magnetic field of the next electric coil 9 flows through the other end of the cylindrical rotary body 2.

A duct 21 may be configured centrally in the interior of the coupling rod 3 respectively the rotary takeup 3, for example comprising ducts branching off, extending for example to each of the electric coils 9, so as to control supply of the electric coils with electric current 9.

The coupling rod respectively rotary takeup 3 is in particular fixedly connected with the first component 32 and it may optionally be configured integrally therewith, or it may be screw-connected with, or welded to it.

It is possible to provide spacer rings 18 between the individual series of rotary bodies 2, for separating the individual magnetic circuits from one another.

FIG. 3 clearly also shows the external thread 14 of the threaded spindle 4, in engagement with the internal thread 15 of the spindle nut 5.

The sleeve 17 is non-rotatably connected with, for example glued to, the threaded spindle 4, which is the second component 33. Employing a sleeve 17 of a ferromagnetic material allows manufacturing the threaded spindle 4 per se for example of plastic, wherein using special plastics is advantageous. This will considerably save weight. Moreover the threaded regions of the spindle units 4 and 5 can be self-lubricating, so that operation of the device 50 can be maintenance-free and low-friction.

A seal 13 is disposed adjacent to the roller bearing 7 comprising for example a radial shaft seal ring, providing contact sealing for all the gaps. Since the rotary takeup 3 preferably consists of a ferromagnetic material and for example a relatively soft steel, a bearing race 28 of a hardened material is preferably applied on the rotary takeup 3 in the region of the seal 13 to prevent wear.

A plurality of magnetic circuits is preferably accommodated in the interior, in the hollow space between the rotary takeup 3 and the sleeve 17 (if the threaded spindle is for example of plastic) respectively the internal wall of the threaded spindle 4 (if it consists of a ferromagnetic material and has no sleeve 17) and the outer surface of the rotary takeup 3. Electric coils 9 are wound either directly onto the rotary takeup 3 or wound onto coil supports 11, which are then pushed onto the coupling rod 3 in the hollow cylindrical inner space.

Adjacent to the electric coils 9, a plurality of rotary bodies or rolling members 2 are preferably accommodated on each of the axial sides, through which the magnetic field of the magnetic circuit closes. For example 8 or 10 rotary bodies 2 may be disposed in one axial position distributed over the circumference.

Figure 4:
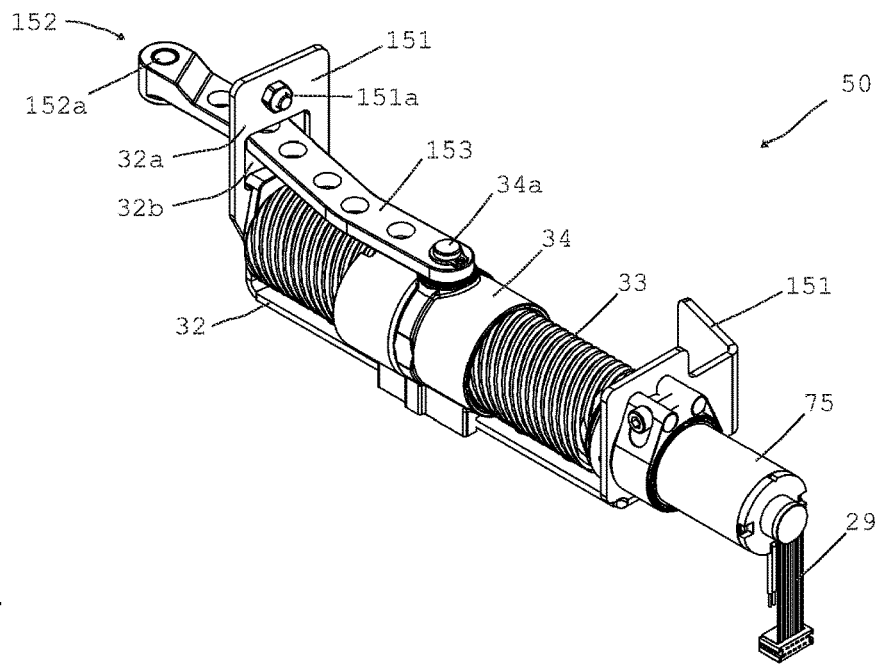
FIG. 4 a perspective illustration of the motion influencing device according to FIG. 2 in an intermediate position.
Figure 5:
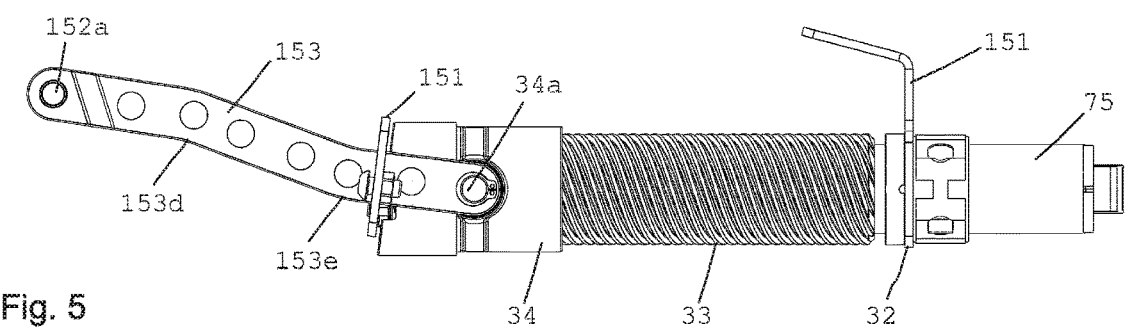
FIG. 5 a plan view of the motion influencing device according to FIG. 2 in an extended position.
Figure 6:
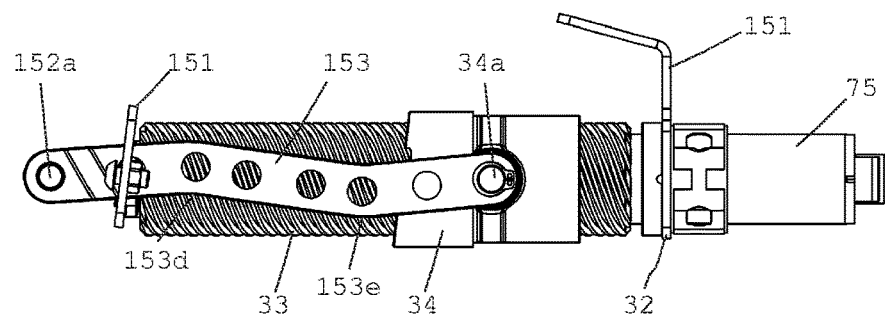
FIG. 6 a plan view of the motion influencing device according to FIG. 2 in a retracted position.

FIGS. 4 to 6 show various positions of the motion influencing device 50 according to FIG. 2. FIG. 4 shows the motion influencing device 50 in a medium position, in which the spindle nut 5 is in an intermediate position. A medium portion of the coupling profile 153, which can be seen in perspective and which is configured elongated, extends through the cutout 32b on the metal sheet or guide sheet 32b. The guide sheet 32b is fixedly connected with the first component 32 and in particular configured integrally thereon.

It can be seen that the cutout 32b is just slightly wider than the coupling profile 153. The architecture shown allows a very narrow construction whose clear width may be less than twice the width of the coupling profile 153 perpendicular to its longitudinal extension. This is achieved in that the coupling profile 153 is articulated on both sides and has such a shape that it always lies in the center of the cutout 32b, notwithstanding the kinematic conditions varying during the motions of the door wing due to the spaced apart connection points respectively door leaf pivoting and fastening points 152a of the drive unit.

The first component 32 may substantially consist of a bent or edge-bent metal sheet and it may be directly screwed to a door wing 104 e.g. by means of screws 151a. The device is in particular mounted in the interior of the door or in the interior of a door structure of the door wing 104.

FIG. 5 shows a plan view of a completely extended coupling profile 153. The device is in the extended end position, and the coupling profile 153 extends maximally through the cutout 32b. In the plan view according to FIG. 6 one can clearly see that the coupling profile 153 comprises multiple, presently two, bends 153d and 153e, oriented in opposite senses. Thus the ends of the coupling profile 153 extend in parallel and they are disposed offset by less than one width transverse to the longitudinal extension. The precise profile shape depends on the installed situation. At any rate, a slim architecture is obtained whose space requirement for installing in the interior of a door wing is small, including in operation.

FIG. 6 shows a plan view of the motion influencing device 50 according to FIG. 2 in a largely retracted position. The coupling profile 153 is largely retracted, extending laterally not beyond the diameter of the second component 33 or the third component 34.

As the FIGS. 4, 5 and 6 show, a guide sheet 32a is fastened to the first component 32 for attaching to a door wing 104. The guide sheet 32a comprises a cutout 32b, through which the coupling profile 153 passes. The coupling profile 153, which is designed elongated and curved, is pivotally coupled with the third component 34 and the second connecting unit 152.

Figure 7:
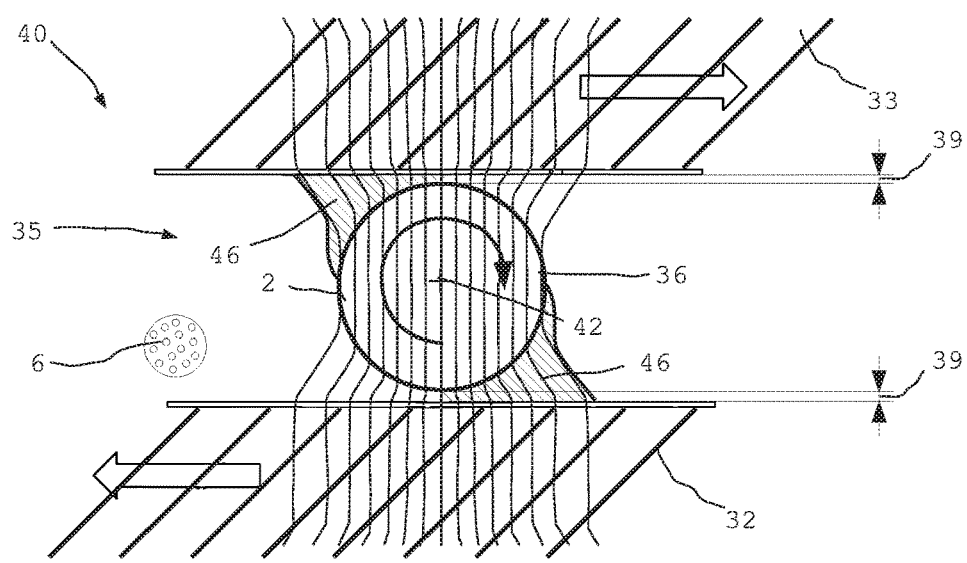
FIG. 7 a diagrammatic section drawing.

FIG. 7 shows a schematic diagrammatic drawing of the function of the magnetorheological transmission device 40 with the basic principle of the rotary damper respectively the braking device 1. This Figure is basically already illustrated in WO 2017/001696 A1. The corresponding description and the entire content of WO 2017/001696 A1 is hereby incorporated by reference.

FIG. 7 shows two components 32 and 33, whose relative motion is intended to be damped respectively controlled and influenced by means of the transmission device 40. A plurality of rotary bodies 2 embedded in a magnetorheological fluid 6 is disposed in a gap 35 between the components 32 and 33. The rotary bodies 2 are separate parts 36, functioning as magnetic field concentrators so that, when a magnetic field is applied and the components 32 and 33 move relative to one another, a wedge effect ensues, so that wedge-shaped areas 46 form in which the magnetorheological particles collect, and by way of the wedge effect effectively braking further rotation of the rotary bodies 2 and relative motion of the components 32 and 33 to one another.

The clear distance 39 between the rotary body 2 and the surface of the components 32 and 33 is basically larger than is a typical or average or maximum particle diameter of a magnetorheological particle in the magnetorheological fluid. Such an "MRF wedge effect" obtains a considerably stronger influencing than could otherwise be expected. The result is in particular a high static force which may be utilized as a retaining force.

The rotary dampers or braking devices in 1 shown in the exemplary embodiments preferably all function according to this "MRF wedge effect".

Figure 8:
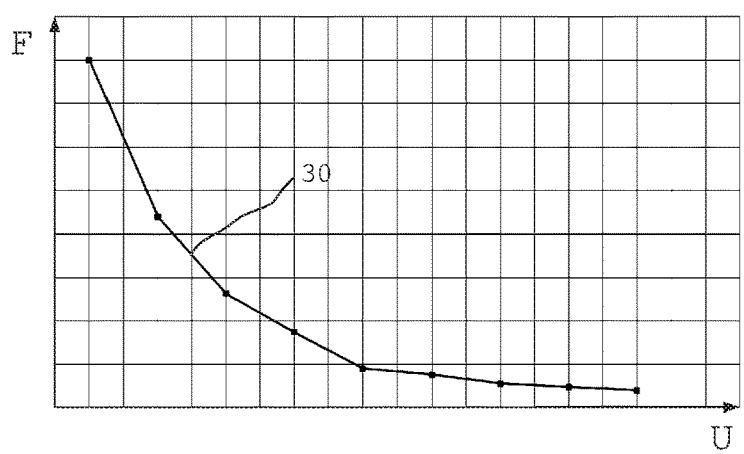
FIG. 8 the force path of a device according to FIG. 7.

The high static force can be effectively used as a retaining force and may be advantageously utilized, as FIG. 8 shows, where the force path of the braking force of the magnetorheological transmission device 40 respectively the braking device 1 is illustrated over the number of revolutions of the rotary bodies (and in analogy, also of the rotatable spindle unit). It can be seen that a standstill of the rotary body 2 generates a very high braking force. When the user overrides the braking force which holds the door open, then the braking force will drop considerably with the speed increasing, even while the magnetic field is still applied, so that the user can readily close the door, overriding the sufficient retaining force, even while a magnetic field is applied.

This effect results in that basically in any random angular position a high retaining force is generated, which the user can readily override for closing the door. This provides for a very comfortable function. The closing function can be motor-assisted so that only slight forces are required at all times.

Figure 9:
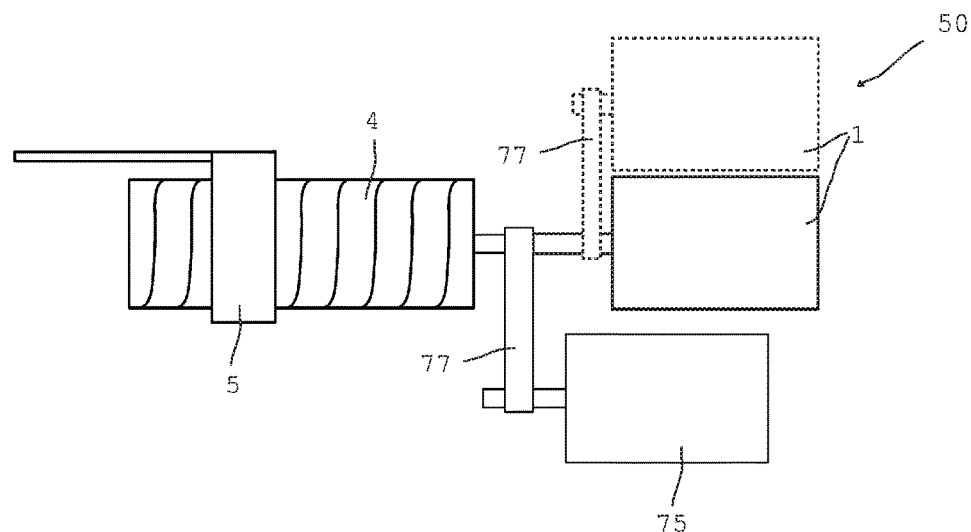
FIG. 9 another construction of a motion influencing device.

FIG. 9 shows a structurally different configuration of the motion influencing device 50. The motion influencing device 50 according to FIG. 9 again provides for the conversion of linear motion to rotational motion, respectively rotational motion to linear motion. To this end the device 50 comprises spindle units 4 and 5. In the axial direction for example the braking device 1 follows, while the drive motor 75 is coupled by way of a belt 77. Alternately it is possible for the braking device to be coupled to the rotation axis of the spindle units via a belt. Bevel gear wheels or the like may also perform deflections of 90° or another angle. FIG. 9 shows in a broken line another, likewise preferred variant where the braking device 1 is not disposed coaxially relative to the rotation axis of the spindle units. The braking device 1 shown in broken lines and/or the drive motor 75 may be linked via a bevel gear system (each), bevel gear wheels, a cardan shaft, chain, etc. and may be oriented in parallel or oblique to the transmission or to one another.

Figure 10:
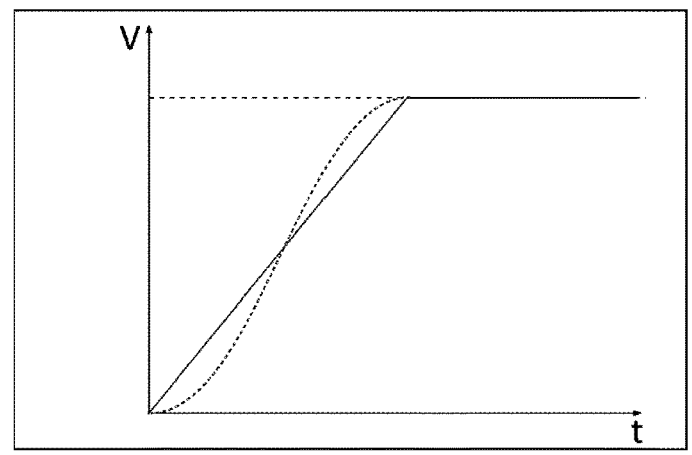
FIG. 10 the progression of voltage over time in starting the drive motor.

FIG. 10 shows a schematic illustration of a conceivable curve of the voltage and thus also of the speed of the drive motor and thus the door wing, over time. As an active motion of the door wing 104 is initiated, then the voltage of the electric drive motor 75 increases according to a linear function from 0 up to the provided operating voltage for normal motion. This achieves smooth starting characteristics of the drive motor 75. Increasing the operating voltage and thus the speed is not necessarily linear but it may for example show the path of a sinusoidal function of 0-90°. Another conceivable path similar to a sinusoidal function in the range of 0-90° is shown in broken lines. Alternately, other functions or curve paths are possible which ensure in particular joltfree starting of the drive motor and joltfree motion of the door wing.

The voltage of the drive motor 75 is correspondingly reduced just before the intended final angle is reached.

Figure 11:
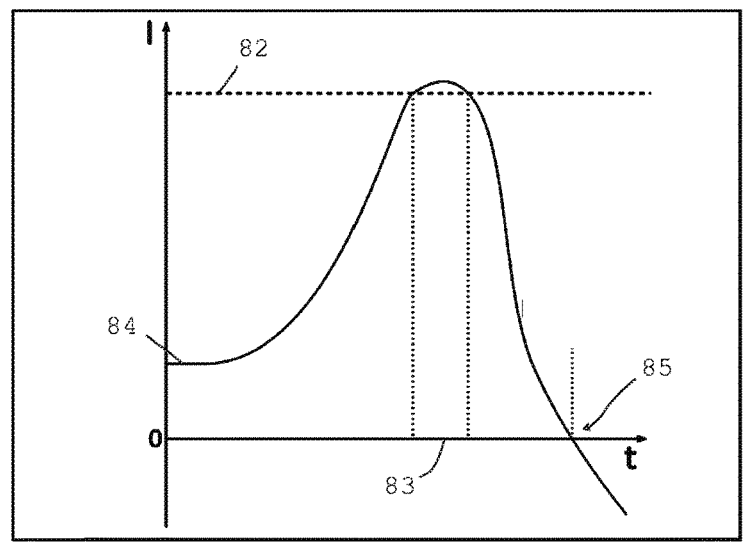
FIG. 11 the current progression over time in case of a collision.

FIG. 11 shows the current progression of the drive motor 75 in a pinching situation 95, indicated on the rear righthand side in the FIGS. 1A and 1B. The door moves at normal closing speed and relatively low force. Accordingly a normal closing current 84 flows through the drive motor 75. As an item or an object is hit, the resistance to the pivoting motion of the door wing 104 increases, so that the motor current rises steeply and finally exceeds the threshold 82 for the maximally permissible current strength. After a time interval 83 there is a response and the voltage of the drive motor 75 is reduced rapidly or suddenly so as to reduce as fast as possible the load applied on the pinched object or the pinched body part. To obtain efficient load relieving, the rotational direction of the drive motor 75 is reversed. At the point in time 85 a direction reversal is achieved so that the door wing 104 is (slightly) opened again at the point in time 85. The door is opened until for example the angle 106 from FIG. 1A is reached. The threshold 82 is not intended to protect the motor but to protect objects, and to protect any pinched body parts it is in particular selected so as to avoid injuries as far as possible, if a pinching instance 95 should ever occur. This is ensured virtually without any additional sensors. Solely the motor current requires monitoring. It is useful to capture the angle of the door wing.

Repeated automatic closing of the door following a collision must either be done manually or it is done at considerably reduced speed. Given a lower speed, the moment of inertia of masses is smaller, so that if any obstacle appears, stopping is possible even faster.

Figure 12:
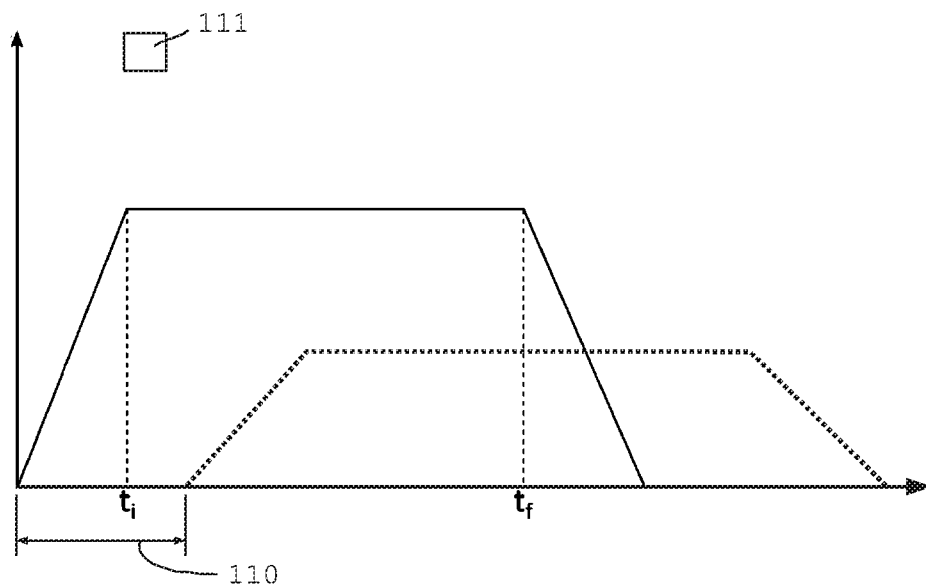
FIG. 12 the progression of the motion speed of a door wing over time.

FIG. 12 shows relevant voltage or speed curves of the drive motor 75 over time. The broken line shows for example a curve in a repeated closing attempt following a first collision, wherein the door wing 104 is then moved at a clearly lower voltage and thus a clearly lower speed.

The broken line furthermore shows a voltage and speed curve of the drive motor 75 over time, as a secondary door 100b and in particular a rear secondary door 100d is to be opened. When the driver stops the motor vehicle 200 and manually or automatically opens the driver door, which is the main door 100a, then if the control device is set accordingly, opening the rear doors 100d and optionally also the front passenger door 100b on the right can be locked. For example if children are taken along on the rear seat, it is advantageous for the children to not be able to open the vehicle doors until the driver has opened his door and exited the vehicle. A time delay for opening the secondary door 100b is set, wherein each of the secondary doors 100b can be activated individually. The delay and time interval 110 ensures that children will not directly jump out of the motor vehicle.

Moreover, secondary doors used by children may be provided for a less than complete opening angle. Moreover, the opening speed may be set lower.

Figure 13:
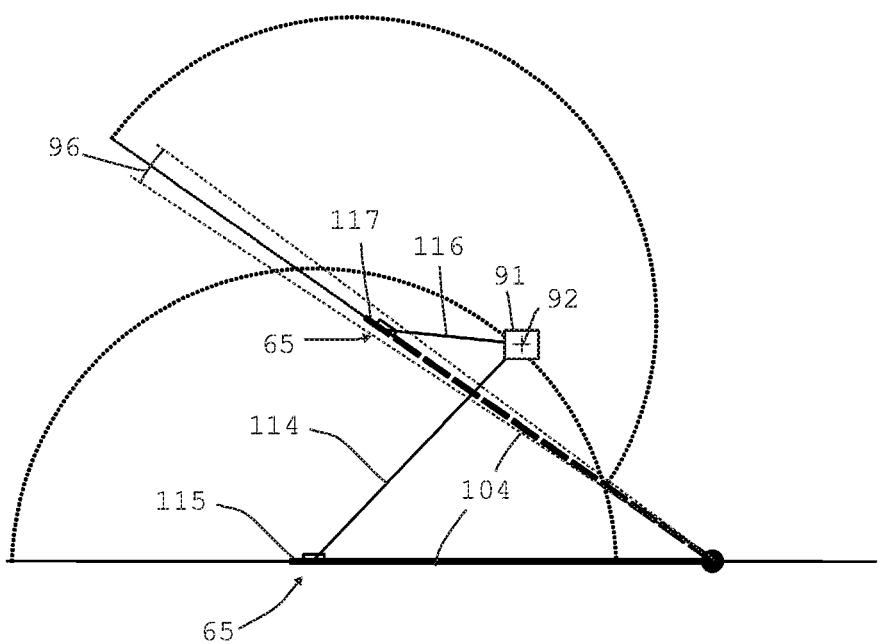
FIG. 13 a diagrammatic drawing of a measuring method for determining the position of an object.

FIG. 13 shows in a schematic plan view the triangulation principle using one single distance sensor 65.

For example the door wing 104 is first in the closed position or shows a first door angle 115, capturing an object 91 at a distance 114. The sensor 65 may for example be a radar sensor.

After pivoting the door wing 104 up to the wider measuring angle 117, the distance 116 from the sensor 65 to the object 91 can be determined. Since the first angle 115 and the second angle 117 are known and the distances 114 and 116 have been measured, conclusions about the position 92 of the object 91 can be readily made.

The door wing does not need to be pivoted about a correspondingly large angular range. It may also be conceivable to pivot the door wing about the door angle 117 for example by the measuring angle range 96. The measuring angle range may be for example 5°, 10° or 15°, or it may be less than 5°. In relation to the position, distance, and size of the object 91, already small angle variations allow to obtain sufficiently reliable results.

The position data of the geographic position 201 of the motor vehicle and optionally particulars of the inside of a building such as the floor level of a parking garage allow to assess the situation in which the doors of the motor vehicle are opened. Further controls employ the time of day, day of the week, and the annual season. Moreover, weather data and personal preferences of the user may be considered.

The doors may accordingly be opened slower or faster, and the maximal opening angle may be selected to be narrower or wider. In a parking garage with narrow parking bays, door wings 104 tend to be opened less wide than in the entryway to the user's single family residence. Unless the user has young children who for example tend to leave toys lying around in the driveway. Then, experience and historical data may be used to ensure a low-risk control of opening and closing doors.

On the whole, an advantageous method is provided. An "intelligent car door" is provided and can be employed for door control. Automatic opening and closing doors by way of an electric motor, and braking and retaining the door in particular by means of a magnetorheological braking device is possible. A cost-reduced sensor arrangement may be used. The sensors employed are basically all prior art according to their functional principle. Improved use and possible combination of distance and angle sensors and current consumption of the electric motors employed allow to save on additional sensors and thus save costs.

New operating modes for door controls are introduced which contribute to safety and damage prevention (both for persons and items and vehicles).

Modern-day car manufacturers state a recognition of a majority of obstacles for automatic doors, and in particular at least 80% or better 90% or more than 95%. It is advantageous to be aware of the non-detected remainder, so that the customers may optionally be granted ex gratia compensation for any damage suffered.

Technically it is not simple to capture 95% of obstacles by sensors alone (ultrasound, radar, lidar, ... ). There are far too many situations and items around doors worldwide.

It is difficult to detect obstacles and items by means of sensors via distance measurement alone. It is more purposeful to make a pre-selection, analyzing and examining the situation in depth. In the case of car doors this means to identify the situation by means of location sensors and/or local recognition and/or image recognition and further information, and to determine these purposefully by means of suitable sensors such as near field sensors.

Initially it makes sense to determine the location and analyze the surroundings. The point in time is known. For example if the vehicle is standing in a desert state in summer, then snow and stones lying beneath etc. are improbable. If the temperature is above X degrees (e.g. 20° C.), snow is at any rate improbable. In a desert (GPS info) many trees and brush are improbable. In a forest, these are highly probable though. In San Francisco many streets are sloped and windy, a salt lake/plain is entirely flat and has no obstacles. In a city, narrow parking places are more probable than in the open countryside. A parking garage shows space conditions different from a parking place in the street in front of a large shopping mall. A densely populated city has many pedestrians and optionally dogs or other animals. A countryside and quiet regions (rural area; country; Scandinavia ... ) will show a small number of persons but maybe cattle or other animals.

Image recognition plus sensors allow to better detect a bush having a thin protruding branch than do sensors alone, in particular if winds move the branches. The image recognition may be employed as a "near field sensor".

It is advantageous to keep an image sensor for image recognition clean. The required optics should be clean enough in various circumstances (rain, dust, snow ... ) so that images can be analyzed. It is advantageous to clean the optics periodically and/or when not in use, to dispose it in a protected position, similar to what the human eyelid does.

An image sensor or a camera is preferably attached so that in an active state the sensor is not readily contaminated and e.g. rain or snow does not directly fall on the optics. It is in particular possible for a cleaning element in the shape of e.g. a cleaning blade to wipe across the optics during retracting and/or extending. In case the camera still gets contaminated it may be retracted and extended for cleaning.

Preferably a lateral image sensor or a lateral camera (optics) is in a protected position when not in use. The image sensor is in particular cleaned by retracting and/or extending. An incorporated cleaning station may be provided therefor.

Continuous image recognition allows to capture the entire lateral surroundings and to collect data in particular on obstacles, within the lawfully permitted scope.

Storing such data is subjected to legal provisions as regards data protection and rights to personal privacy. The object is not, collecting data about persons.

Autonomous deflection of the door is very advantageous if the door detects the approach of an item or a person (e.g. a shopping cart). Preferably the door closes automatically, in particular as a constant specific space is penetrated, so as to avoid collision with the door and thus damage to the surface paint. However, such motion ends at a specific closing angle so that no fingers etc. are pinched. The door is moved by means of the electric motor. Controlling the motor (via voltage control) in particular does not involve a step response, but increasing is linear or by any desired function, so that the drive motor (motor) does not start jerkily but accelerates evenly (see FIG. 10).

To avoid unnecessary loads on the drive motor (low speed, strong current), the braking device (MRF brake) may be used additionally for braking and retaining the door.

The distance to an object may be controlled by means of a radar sensor, as will be described below in more detail.

One object is the recognition or smart capture (computation, analysis) of the largest possible quantity of situations by means of available sensor signals and data. The control device "knows" by means of GPS etc. that a shopping center is near or in the vicinity. Then, persons and shopping carts are more probable. This reduces costs for series production for the entire system.

In all the cases it is possible to open and close a door (in particular the driver door) with pedals. The accelerator pedal may be used for automatic opening and the brake pedal, for closing. This function must only operate with the motor shut off, since otherwise the risks would be too great. When the motor is shut off, the pedals which are normally intended for driving may be used for opening and closing the door (doors).

The MRF braking device 1 simulates the slide gate of a normal hinge. In specified angular positions the door is braked. For opening the door wider or closing it, the user must overpress a "barrier" (high resistance). As the end angle of the barrier is reached, the braking device lets go, and the door moves virtually resistance-free up to the next click-stop position. Thus, if the user prefers, he senses the "normal" feel to which he is used when opening a door.

A pinch protection and/or child safety mode for "closing" generally increases safety and serves as a child safety system specifically for rear doors. When the door is closed manually or automatically, there is the risk for a child to pinch its finger or arm in closing. A solution involving an additional sensor is conceivable, wherein a sensor is e.g. installed in the door seal. Thus, the sensor detects obstacles (finger, hand, etc.) during closing. This involves a certain complexity since additional sensors are required. The MRF braking device is fast enough for saving travel distance because the sensor in the door seal only travels over short compression distances. The seal is thin, and only short travel is available for detecting pinched items. Fingers etc. only show minor yield. For closing and for the lock to fully snap into place, a comparatively high door speed is required due to the door seals and the resistance caused thereby when the door is closed, until the lock fully snaps into place.

An advantageous variant is to first perform situation detection and to determine the location of the vehicle and/or the persons sitting in the vehicle. Recognition of children and recognition by way of family relationships and/or seat sensors is possible. An interior camera may be useful.

Preferably the door or the door wing closes at a normal speed until it is open one arm's width to then considerably decelerate and thus continue at a low inertia energy. The power input of the drive motor may serve to detect an increase in resistance. The power input increases since the load on the drive motor increases. As is shown in FIG. 11, braking starts immediately, the drive motor immediately opens a little and waits. An acoustic signal is emitted. Then the user must close the door manually. To enable the controls to differentiate this increase of current when hitting an item, from a starting current when accelerating the door, the current value must maintain the increased value for a certain time. For example if the value is above 4 A, given a regulation frequency of 10 kHz over 1000 cycles, the regulator sends a negative current to the drive motor to reverse the rotational direction and thus to open the door.

Alternately to manual closing, closing may be done slowly once again, automatically or by push button, in particular following a short interruption. If resistance-free closing is possible, the door may be slammed shut automatically, with briefly opening the door to e.g. 15° to gather momentum. Thereafter the door is closed at a speed just high enough as required for clicking the lock in. The speed is in particular not increased suddenly but according to a function, e.g. in a straight line or another, in particular continuously, increasing function. Thus the door wing together with the drive motor and the current sensing including "approach by feel" is the sensor. This is advantageous if the drive has sufficient force for the closing operation. The user may primarily use it for the rear doors where children tend to be sitting. It may also be used for the front doors. The user may adjust the settings.

"Gathering momentum" in pulling shut is an advantage over assisted pull, where an electric motor pulls the door entirely shut at a consistent speed. Then an electric lock may be required if the required force is too high, in the case of low speed. In this case a normal (mechanical) lock can be used and an electric motor of a relatively low power that is just high enough to obtain sufficient speed for completely closing the door, including on a slope. Additionally, sensors in the door interiors (in the seals) can be omitted. This allows considerably economizing on costs on the whole.

Additionally, as a child safety system and safety in general, the door may be provided to be opened only if the vehicle is stationary, monitored by the control device.

Time-delayed opening of doors is advantageous, in particular for additional safety for children. When a car is parked, children sitting on the rear seats cannot open the door in particular until the person (adult, parent) in front exits. Thus there is more time for taking care that the children do not exit and do not get involved in road traffic accidents.

When the persons in front have exited, the rear doors may be opened. The maximum speed for opening may be limited so that the children cannot carelessly open the door toward the street or toward another parked car or an obstacle. The opening angle may be limited to a restricted angle, since most children do not need as much room as do adults.

At the same time the exiting aid may be automatically activated after opening, so that the door is retained in the opened position, for the children and/or adults to hold onto during exit so that they do not pinch themselves.

Preferably a "soft stop" is realized, and the door is prevented from overshooting. The braking device also aids in slowly decelerating the door movement, so as to prevent overshooting. At the same time the controls detect it if the door swings back in a fast braking action, so as to release, or contain, the motion e.g. if the door is intended to be closed again immediately by way of the return impulse. The brake and the drive are initiated at a precise point in time, utilizing inertia instead of fighting it.

Obstacle recognition in particular by radar is advantageous. Radar basically only allows to detect a distance but does not know the location of the item (one-dimensional). Thus it is advantageous to move a door wing with a radar sensor attached thereto so as to capture distance values for varying rotational angles and to build therefrom an at least two-dimensional "map" of the surroundings, which is considered for movements, so as to largely prevent collisions.

It is advantageous to include the opening angle of the door. The angle and the position of the sensor in or on the door is known. This results in another dimension. Calculation allows to capture the position of the item at higher accuracy respectively to narrow the position down. Moving the door changes the signal measured by the sensor. These changes allow to compute back to items in the vicinity, since the signal (distance signal) changes at different speeds. For rotational motion while opening the door and for various positions of an item relative to the rotation axis, see FIG. 13. The door may in particular be moved back and forth in particular within a small angular range, so as to measure an item (or a number of items simultaneously).

A controlling scheme for object detection by means of a radar sensor and angular measurement in or on the electric motor is like this: First the sensor (radar sensor, distance sensor) installed in the door is queried. Then the radar signal data is processed and filtered etc. The radar distance from the object is determined. Angular measurements are taken in parallel to determine the angle of the door wing. The door angle is computed. Now, data fusion by way of trigonometry is carried out by means of the door angle and the radar distance, by pairs of angular values, taking into account the changed angle. In the control device the data is processed and the motor current is regulated by way of the power supply voltage to move the door as desired.

Controlling is performed as follows:
a) The actual distance is detected by radar.
b) Is the actual distance less than the threshold value?
c) If b) is no, controlling is set to maximum permitted opening angle with the brake activated.
d) If b) is yes, the question is asked, is the door angle above the maximum value?
e) If d) is no, the question is asked, is the door angle less than permitted.
f) If d) is no, the distance is adjusted.
g) If d) is yes, the question is asked, is the actual distance of the radar higher than the target distance?
h) If g) is no, the engine is turned off and the brake is activated or adjusted.
i) If g) is yes, the clearance is controlled and adjusted.
j) If d) is yes, the question is asked, is the actual distance of the radar less than the target distance?
k) If j) is yes, the clearance is controlled and adjusted.
l) If j) is no, the controlling is set to the maximally permitted opening angle with the brake activated.

A recognition of surroundings and situation is advantageous. Recognition of the surroundings by radar is preferred. Solely by way of lidar, ultrasound, image recognition etc. is difficult. The quantity of items and situations is too large. Pre-selection is therefore advantageous.

Knowledge about the user's intentions is advantageous for entering or exiting. Intentions tend to be clearly recognizable. When the vehicle is closed and/or stationary for an extended time, e.g. in the garage. GPS or other sensors reveal e.g. where the garage is at home. Further dependency ensues by way of the time: night, day, workday, holiday, . . . ). The user approaches the vehicle, opens the door. He enters (as do further occupants), fastens his seat belt, and starts the vehicle respectively the engine. Thus the vehicle/the door controls know who is in the vehicle and what functions may or need not be required.

The vehicle starts, at the next stop the occupants release their seat belts and the driver switches the vehicle or engine off. The seat detector supplies data on who is located where. An occupant e.g. exits. The location (home; workplace, shopping, . . . ) allows conclusions about the surroundings (trees, pillars, walls etc.).

This may be used for example if an occupant follows certain routines: Thus, a user drives the children to school in the morning. The controls know the time and the route (via GPS; cell phone info). The control device knows e.g. by way of the seat detector, where a child is located, e.g. in the rear. When the child exits, the opening and closing mode is set including a child safety system. The same may apply to front passengers. Then the door opens in the correspondingly provided mode.

The seat detector can detect it if a foot protrudes out of the vehicle in exiting. The control device recognizes that an occupant intends to exit, and opens the door appropriately.

Special situations are preferably considered, e.g. the case that an occupant gives something out of the vehicle to a person outside the vehicle. Then the vehicle motor tends to be running and the hand brake may be applied. The seat belt is fastened. The seat belt is pulled out because the occupant moves. The control device detects this, and opens not at all or just a little.

The rain sensor or the weather app detect rain or snow. In unfavorable weather, people wish to enter or exit faster. Then the doors are opened correspondingly (faster). The opening angle may be selected larger to accommodate an umbrella. The umbrella is e.g. placed behind the front seat, to which end the rear door is opened.

The wind indicator in the weather app or rain app is used to consider winds. The doors are better secured. The control device is virtually prepared and "sensitized". The braking momentum and/or driving torque for door motions is increased from the start to prevent fast, unintentional pivoting open and shut.

When a driver is waiting, letting a passenger exit, e.g. in front of a department store or a pharmacy, the driver remains in the vehicle with the seat belt fastened, while the engine is running. The position is known through the GPS. The passenger exits, and the driver slowly sets the vehicle in motion up to the pickup position. The door is opened.

The surround recognition of the door also allows to detect puddles. The control device detects a puddle of water with the surround sensors, informing the driver so as to not stop precisely for himself or other occupants to step into a puddle. The recognition may be activated in dependence on the number of occupants.

Retaining a door in a sloping street is advantageous. Handling the door and retaining the door in a sloping street position is comfortable. The result is motion with a nice haptic feel. Only in the combination of an electric drive motor plus a variable MRF braking device is it feasible involving reasonable costs. Permanent magnets are also advantageous for retaining the door currentless in an open state since they also allow to set up a currentless, permanently high retaining force.

Acceleration sensors may be located in any place in the car, they do not need to be inside the door; or other sensors for measuring the position and location of the car are advantageous as well. The information whether an incline or a horizontal or plane surface is given is sent to the control device. Thus, the controls can immediately start braking the door as it is opened downwardly on a slope, to prevent the door from opening too fast and too wide. In an uphill position the controls know that the electric motor must apply a higher force for opening the door. The brake must also apply a higher force for retaining the door in a stopped position. The sensor applied may be any of the sensors already installed in the car, e.g. a sensor in the tire measuring the position of the tire, or another available sensor.

A combination of the electric motor and the braking device is advantageous because retaining the door in position by means of an electric motor alone would involve high current intake. The electric motor would have to be much larger than is required for opening and closing. An MRF braking device, however, consumes little current, when the brake is additionally equipped with permanent magnets it does not need any current therefor. Retaining a door open for an extended time does not involve a high risk of emptying the car battery.

Moreover the braking device is very advantageous for a good haptic motion course, since in opening and closing, the braking device can brake the door so that the door does not pivot beyond a point but can be braked slowly up to exactly a given point.

Motor vehicles with direct or indirect internet access may use information from the internet as an option of surround recognition for vehicles. Motor vehicles equipped for mobile internet may e.g. download satellite pictures to thus detect static obstacles etc., may download weather data, etc. Public WLAN networks in shopping centers, bars, railway stations etc. may also be used for obtaining information (from the internet or immediately from the information of the WLAN network).

For determining the location of a vehicle if no GPS signal is received, the radio cells of a mobile radio network may be used (for rough location). Preferably, global parameters such as the annual season, temperature, location (e.g. via GPS) and the time of day are used. Local parameters, such as the current weather, slope, and position (garage, parking garage etc.) are in particular used. The records of an image sensor enable image recognition by the control device for identifying the surroundings. In all the configurations, noise can be captured and detected. In advantageous specific embodiments, occupant sensing is performed. The state of the car (stopping, parking, traveling) may be considered.

At least some of the data described above can be preselected. Sensors for obstacle recognition and angle sensors may be taken into account. On the basis of the above, door motions are controlled and in particular regulated, wherein the speed of door motions, the opening angle etc. are controlled.

Knowledge about various external conditions allow adapting the parameters even without sensors in the door, and certain options may be prohibited, e.g. snowfall in 40° C. outside air temperature. With this data the parameters may be optimized.

Pre-selection can advantageously be graded in multiple stages, depending on the sensors used or data processed:

A global stage comprises the location and thus the climatic zone. The location may be determined via GPS. The temperature may be captured by a thermometer. Also, the time (day, night) is considered. Light conditions can be sensed by the headlights control sensor.

In a local stage the garage or shopping center etc. is determined e.g. via GPS. The weather (rain, wind, show) may be derived from data from the internet, or from rain sensors of the windshield wiper system. The car position relative to the horizon (inclined on a slope or horizontal) may be measured e.g. with acceleration sensors (already installed in tires or in the engine compartment or in the car body).

Image recognition e.g. by means of an image sensor or a camera and using an image recognition software scans the surroundings for obstacles and other problem spots. The color of the ground may provide information on the condition (grass=green, snow/ice=white, blueish and gray).

Noise recognition may capture driving noise by a microphone. Software may draw conclusions therefrom on the road conditions (asphalt is silent and homogeneous; metalled roads are noisier and inhomogeneous; meadow/grass has a different noise quality; cobblestone is very loud), available microphones for hands-free systems in the occupant space could be used.

The road conditions may be determined from the damper behavior; thus, e.g. adaptive MRF dampers may detect uneven ground.

The occupant sensing system may detect the weight on the seats, or children, adults and items such as shopping bags are identified by cameras and image recognition.

Voice recording allows to use keywords for conclusions on external conditions, wherein data protection is observed.

Alternately or additionally to radar sensors, laser may be used. The laser illuminates the surroundings in front of the door. To this end it may e.g. cast a grid on the surroundings (with diffraction grating or by fast moving mirrors or another technology). A camera sees the shape of the grid and can thus make very precise conclusions on the shape of the surroundings, clearly detecting obstacles. This method shows the advantage that materials are recognized which are invisible to radar, e.g. various plastics, snow, wood, etc. and any materials not transparent to the wavelength involved.

Preferably, an infrared laser in combination with an infrared camera may be used. Infrared light is invisible to humans and thus not interfering, and infrared lasers are inexpensive since they are used in huge quantities for telecommunication applications.

In an example the preselection by GPS data detects a location close to the equator. The temperature is high (>30° C.), and noise recognition allows the control device to detect a soft ground. Thus, the car is very likely on sand. After opening, the door is retained in the exiting aid mode so that the user does not slip and fall down on the sand. The same applies for low temperatures and precipitation, indicating snow and ice.

Driving on a metalled road increases the probability for trees, brush, and stones on the road, compared to city streets. Instead, bollards, traffic lights, other vehicles etc. are rather improbable.

FIG. 12 shows a path of the angular velocity (e.g. in the interior of the drive motor 75). The angular velocity while closing the door is set to a value which the user may specify, e.g. 200°/s in the motor/spindle.

Then the motor turns at a constant angular velocity until a target angle (of the door wing) is reached, or up to a deviation of e.g. 1° in the case of "pinch protection". As the target angle is reached, the motor is again braked at constant deceleration.

Rotational speed regulation and current control occurs via online trajectory generation and combined therewith, position control. Signals may be smoothed so as to filter out e.g. current spikes.

This current control for door motions is a cascade control. Initially, the controller receives the angular position of the door and the internal angle of the motor. The trajectory generation computes the current target angle of the motor and forwards it to the position control. The temporary motor angle position is compared against the target position and a signal for the target value of the angular velocity is generated. The speed regulation in turn compares the actual value against the target value of the angular velocity, issuing a current value for the motor. Finally the signal is smoothed so as to avoid current spikes.

In general, the entire opening range of a door may be subdivided in various angular sections.

The first opening range comprises the closed state and "disengage from the lock", wherein the lock is no longer clicked in.

The second opening range comprises the angular range in which exiting is not yet possible even for slim persons. One can at the most stick one's hand through to pass an object out.

The third opening range is the angular range in which slim to medium sized persons exit.

The fourth opening range is the angular range in which medium-sized to large persons exit, defining a wider opening angle.

The fifth opening range follows, up to the maximum opening angle.

In all the cases, additional functions may be implemented, e.g. a display on a cell phone, a smart watch or the display in the car, on all the devices connected and operational.

A warning may be emitted if the radar or another important function is not operational. The warning may be an acoustic and optical warning e.g. emitted on the cell phone.

It is very advantageous for the cell phone, the smart watch or the on-board computer of the vehicle to indicate whether or not the radar detects an item. A traffic light indication mode may be provided: red-amber-green.

Sliders may be provided for setting different opening speeds in an app so that the user may set his preferred speed. The basic setting in particular provides for slow speed.

An entering and exiting aid (braking the door wing for retaining the angular position) may be activated by prolonged stepping on the brake pedal during exiting, which is preferably only possible from the opening range 2 onwards.

An entering and exiting aid is virtually not (never) permissible in the opening range 1, since this opening angle prohibits any exiting. If activation is still desired, the driver may be shown on his cell phone or hear e.g. on the sound system of the car or see on a display of the on-board computer that activation is not possible. The driver might feel locked up.

An entering and exiting aid may be useful in the second and third opening ranges.

It is possible for the opening range to adapt to an (identified) person.

An entering and exiting aid may be cancelled by actively, briefly pivoting the door back and forth.

With an entering and exiting aid activated, fast door motions for release with a drive motor may be prohibited. The drive motor may be used for braking, if the angular velocity rises too high with an activated entering and exiting aid (if the loads acting on the door are e.g. too high).

If a person or object is within the radar range during closing, rapid opening to the open position 1 may occur upon detection.

As a protection from pinching/child safety system (activation by dedicated knob) the door may close at normal speed up to ca. 10 cm in front of the normal closed position. Thereafter it moves quite slowly, checking for any objects between the door and entry. If yes: door immediately opens again a small distance (recognition via power input). If no: door "gathers momentum for closing (closing motion)".

A direct connection of the spindle unit with the coupling rod is also possible and preferred: The spindle may be directly connected with the coupling rod so that the coupling rod cannot pivot relative to the spindle. This allows a thinner architecture of the motion influencing device. In this variant the spindle nut is directly attached to the drive respectively brake unit, and the spindle moves in the axial direction relative to the drive and the brake.

In all the cases the control device can—upon the user's respectively occupant's assent—also access, and include, sensor data or other data from mobile telephones or smart phones and/or data from other smart devices.

The motions of a door wing may be controlled, taking into account the currently prevailing situation.

Accordingly, when controlling door motions, the geographic position and position data of the motor vehicle may be included. The geographic position and/or the position data and/or the occupant sensing system allow an initial assessment of the situation. It can be detected whether the motor vehicle is standing on the beach or in a car park or whether children are inside.

The sensors allow to identify a situation and to control the door motions in relation to the situation. Situation parameters may include, the position, environment, occupants, weather, etc. Other parameters may be added.

Door motions of at least one controllable door of a motor vehicle may be controlled. The sensor arrangement advantageously comprises a sensor (or current sensor), which captures a measure of the motor current of the drive motor or the rotational force of the door wing. If the door wing is not yet closed, the control device can identify an obstacle, at least while closing and/or opening the door wing, already by the fact that the power input of the drive motor or the rotational force of the door wing rises above a predetermined threshold, because the rotational force required for moving the door increases due to the obstacle. Then the control device stops the drive motor in particular immediately, or the fastest possible. This method may be used in reverse also, or only, for opening, so as to reduce, or even completely prevent, damage from an obstacle hitting the door wing.

Door motions may advantageously be controlled by a controllable door of a motor vehicle, wherein the motor vehicle may comprise at least two doors with movable door wings, one of the doors being a main door, and at least one of the doors, a secondary door. At least one control device and at least one sensor arrangement are attributed to the doors. At least the secondary door comprises a controllable motion influencing device, wherein a motion of the door wing of the secondary door can be at least partially controlled and influenced by means of the motion influencing device, to alternate between a closed position and an open position. At least in the closed position the motion influencing device can brake a door wing of the secondary door until the situation has been analyzed. The situation analysis or situation recognition may be performed prior to stopping, or during or after stopping the motor vehicle. In dependence on the situation analysis the opening mode of the secondary door and also the main door may be influenced.

During opening or closing, a ripple mode may be employed at least in one angular section. A ripple mode, wherein the door wing motions are alternatingly braked stronger and weaker, draws the user's attention. This also happens if only a relatively weak braking force is generated which even children may override. Safety is increased, since during entering or exiting the braking force counteracting the opening or the ripple-like motion reminds the user to not exit (inattentively) or to open the door wing wider (or to close it further). The ripple mode offers still clearer warnings than do a mere increase of force or acoustic warning signals.

This also prevents absent-mindedly moving the door wing or exiting. Haptic, acoustic and/or optical warning signals may also be emitted. Haptic warning signals while opening e.g. a secondary door may be emitted e.g. on the steering wheel.

It is also possible to permit the door opening in ripple mode only by a quite narrow angle and then to be blocked. The advantage thereof is that the user realizes that the door can basically be opened, and the user is not locked in. The user realizes that the door should not be opened because there is a dangerous situation.

In a predetermined and/or dynamically defined angular section the motion influencing device decelerates the door wing multiple times, alternately at higher and lower strength, in the angular section between two angular ranges. The braking momentum or the door operating force thus varies multiple times. The variations stronger/weaker may occur at short time intervals and/or at narrow angular distances. The braking force or the braking momentum may rise and fall linearly or in a sinus or other curve.

It is advantageous for the mode for opening a secondary door to differentiate between children and adults. In the child mode the opening speed may be restricted stronger than in the adult mode. Or, the maximum opening angle is restricted stronger in child mode.

In all the configurations the invention may be employed in trucks, busses, taxis, and also in self-moving vehicles and self-moving taxis, i.e., driver-less vehicles.

The following is a list of reference numerals used in the above description of the invention with reference to the drawing figures:

1 braking device, rotary brake, rotary damper
2 rotary body, rolling member
3 rotary takeup, axle unit, coupling rod
4 spindle unit, threaded spindle
5 spindle unit, spindle nut
6 magnetorheological fluid
7 bearing
8 magnetic field source
10 electric coil
11 magnetic field
12 coil support
13 threaded nut
14 seal
15 external thread
16 internal thread
17 punched nut
18 sleeve
19 spacer ring
21 position sensor, location sensor
22 duct
23 speed parameter
28 angular velocity, motion speed
29 bearing race
29 cable
30 force path
32 component
32a guide sheet
32b cutout
33 component
34 component
34a pivot axle
35 gap
36 separate part
39 clear distance
40 transmission device
42 rotation axis
46 wedge shape
50 motion influencing device, device
55 control device
56 comparator
57 memory device
58 table
59 hand sensor
60 sensor arrangement
61 angle (of the door), pivoting range
61a angular range
62 location sensor
63 position sensor, GPS sensor
64 inclination sensor, acceleration sensor
65 surround sensor, distance sensor
66 image sensor
67 radar sensor
68 inside space sensor
69 current sensor
70 driving device
71 drive housing
72 drive shaft
73 drive accommodation
74 transmission
75 drive motor
76 engaging dog
77 belt
78 data interface
80 actuator
81 biasing unit
82 threshold
83 time interval
84 normal closing current
85 direction reversal
86 drive
90 hand
91 object
92 position of 91
93 arrow/speed
94 obstacle, item
95 pinching instance
96 measuring angle
100 door, door component
100a main door
100b secondary door
100c front door
100d rear door
102 closed position
103 open position
104 door wing
105 (narrow) angle
106 (somewhat larger) angle
110 time interval
111 switch
112 speed of 100a
113 speed of 100b
114 distance determination
115 door angle
116 distance determination
117 door angle
151 connecting unit
151a screw
152 connecting unit
152a pivot axle
153 coupling profile
153d bend
153e bend
160 sensor
200 motor vehicle
201 motor vehicle component
202 position of 200

The invention claimed is:

1. A method of controlling a door movement of at least one controllable door of a motor vehicle, the method comprising:
providing at least one control device and at least one sensor arrangement associated with the door and providing the door with a controllable motion influencing device;
selectively influencing a movement of a door wing of the door under control of the motion influencing device in alternation between a closed position and an open position; and
acquiring data from inside space sensors and identifying a certain person, retrieving stored data of personal preferences of the person and using the data for controlling the movement of the door wing.

2. The method according to claim 1, which comprises obtaining position data with a position sensor.

3. The method according to claim 1, which comprises obtaining position data with a data interface.

4. The method according to claim 1, which comprises acquiring data from sensors selected from the group consisting of ultrasound sensors, radar sensors, Lidar sensors, image sensors, and acceleration sensors.

5. The method according to claim 1, which comprises acquiring and using weather data.

6. The method according to claim 1, which comprises acquiring and storing data.

7. The method according to claim 6, which comprises checking stored data for repeat events, and performing situation recognition based on the stored data, and storing significant data of a recognized situation.

8. The method according to claim 7, wherein, for recognizing a situation, using stored position data, corresponding times of day, and data of at least one inside space sensor.

9. The method according to claim 8, which comprises, upon detection of a known situation, loading preset parameters for motions of the door wing.

10. The method according to claim 7, which comprises offering a stored situation for manual selection.

11. The method according to claim 10, which comprises suggesting with the control device potentially applicable, stored situations, and enabling the potentially applicable situations to be selected.

12. A motor vehicle component for performing the method according to claim 1, comprising:
   at least one controllable vehicle door including a controllable motion influencing device, wherein a movement of a door wing of the vehicle door can at least partially be controlled and influenced by the motion influencing device to alternate between a closed position and an open position;
   at least one sensor arrangement configured to acquire data from inside the motor vehicle identifying a person inside the motor vehicle;
   at least one control device connected to receive the data from said at least one sensor arrangement, to retrieve stored data of personal preferences of the person in the motor vehicle, and configured to control movements of the door wing in dependence on the data.

13. The method according to claim 1, which comprises acquiring position data with the control device that are representative of a geographic position of the motor vehicle, and controlling the movement of the door wing with the control device in dependence on the position data.

14. The method according to claim 1, which comprises acquiring weight information from the inside space sensors for determining a weight of an occupant and whether or not a given seat is occupied, individually associating a given seat with a person, and controlling a respective door as a function of an association between the given seat and the person.

* * * * *